A. EPPLER.
MACHINE FOR PREPARING WELTS.
APPLICATION FILED JULY 20, 1906.

1,026,306.

Patented May 14, 1912.
4 SHEETS—SHEET 1.

Witnesses:

Inventor:
Andrew Eppler
by his Attorneys
Phillips Van Everen & Fish

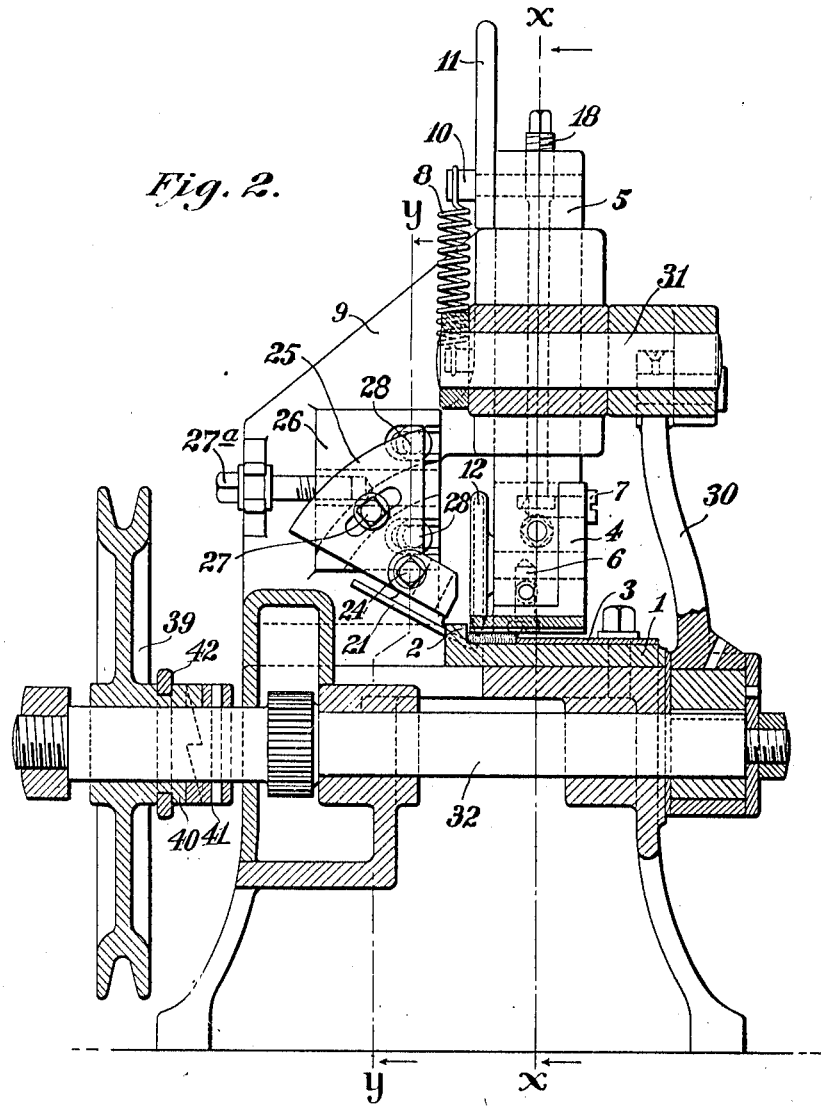

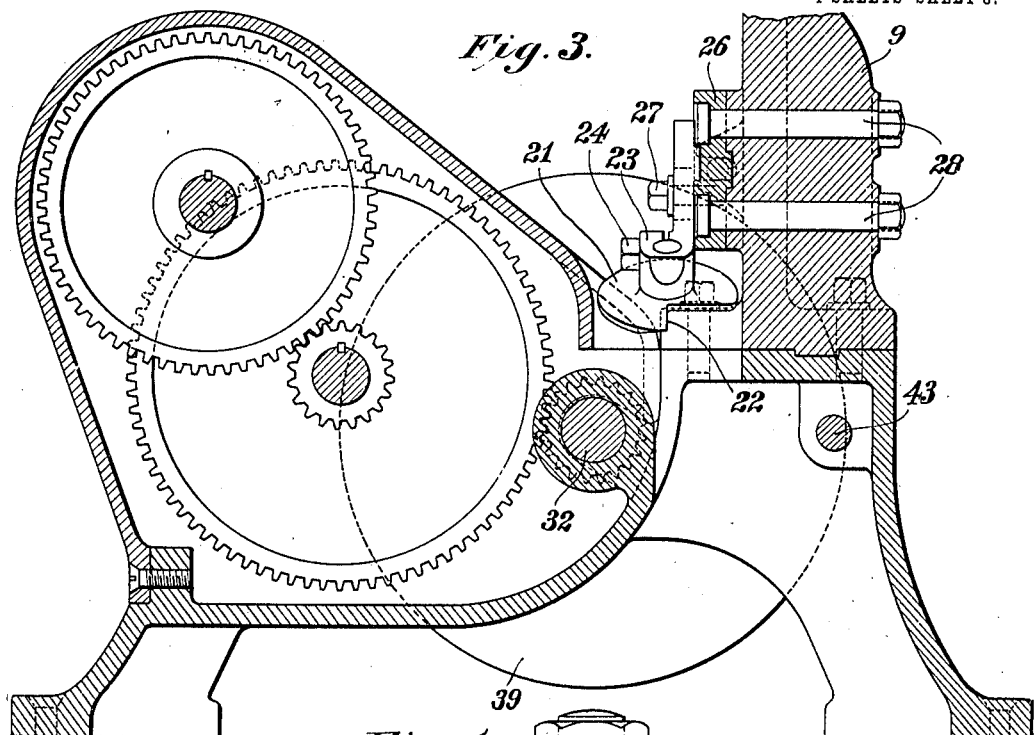
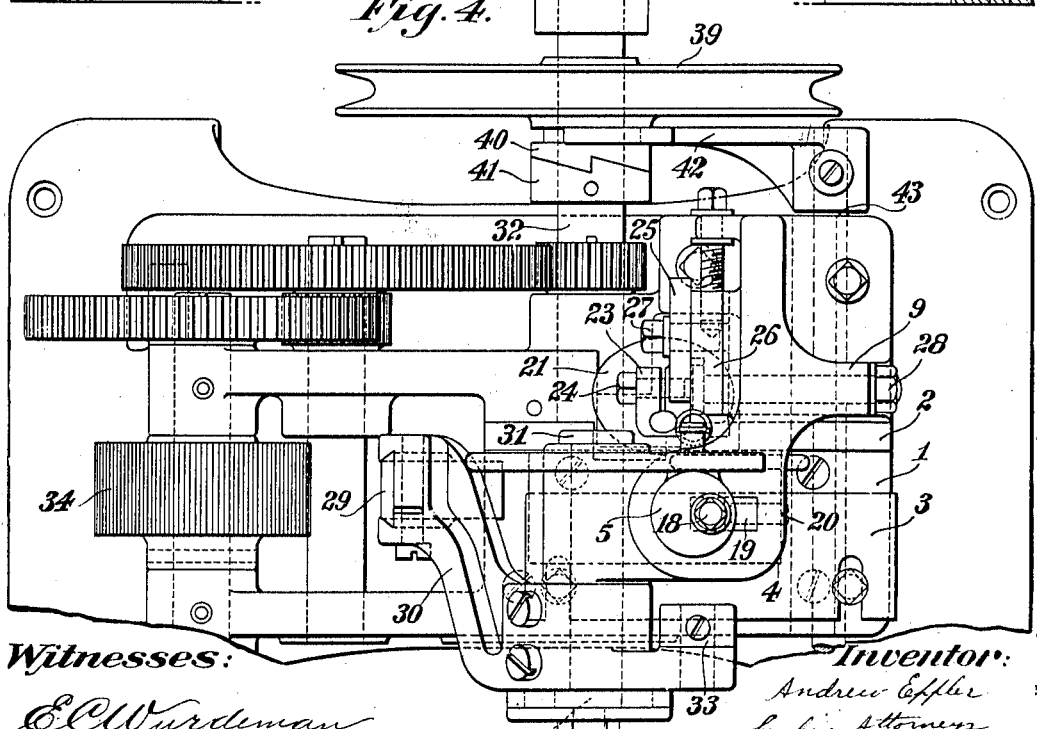

A. EPPLER.
MACHINE FOR PREPARING WELTS.
APPLICATION FILED JULY 20, 1906.

1,026,306.

Patented May 14, 1912.
4 SHEETS—SHEET 4.

Witnesses:
E. C. Wurdeman
Alfred H. Hildreth

Inventor:
Andrew Eppler
by his Attorneys
Phillips Van Everen & Fish

UNITED STATES PATENT OFFICE.

ANDREW EPPLER, OF BOSTON, MASSACHUSETTS, ASSIGNOR TO UNITED SHOE MACHINERY COMPANY, OF PATERSON, NEW JERSEY, A CORPORATION OF NEW JERSEY.

MACHINE FOR PREPARING WELTS.

1,026,306.  Specification of Letters Patent.   Patented May 14, 1912.

Application filed July 20, 1906. Serial No. 326,970.

*To all whom it may concern:*

Be it known that I, ANDREW EPPLER, a citizen of the United States, residing at Boston, in the county of Suffolk and State of Massachusetts, have invented certain new and useful Improvements in Machines for Preparing Welts; and I do hereby declare the following to be a full, clear, and exact description of the invention, such as will enable others skilled in the art to which it appertains to make and use the same.

The present invention relates to machines for preparing welts which are used in the manufacture of welted shoes.

The welt of a welted shoe consists of a long and narrow strip of leather which is sewed to the upper and insole of the shoe and serves as a means for connecting the out sole to the other portions of the shoe. To enable this strip of leather to be readily applied to the insole and upper, it is usually provided with a bevel upon its upper surface at its inner edge and with a groove upon its under surface near its inner edge. The welt strip is also sometimes provided with transverse cuts or slashes upon its under surface extending across the portion of the strip between the groove and the outer edge, the purpose of these slits being to render the welt flexible and permit it to be more easily beaten out flat after attachment to the shoe.

The object of the present invention is to provide an improved machine for slashing a welt strip.

With the above object in view the present invention consists in an improved welt slashing mechanism, in a feeding mechanism which is combined with the welt slashing mechanism, and in certain devices, combinations and arrangement of parts tending to improve the construction and mode of operation of machines for preparing welts, the advantages of which will be obvious to those skilled in the art from the following description of the preferred embodiment of the invention.

The various features of the present invention will be clearly understood from an inspection of the accompanying drawings in which are illustrated a machine for preparing welt strips embodying the same in their preferred form.

Figure 1:
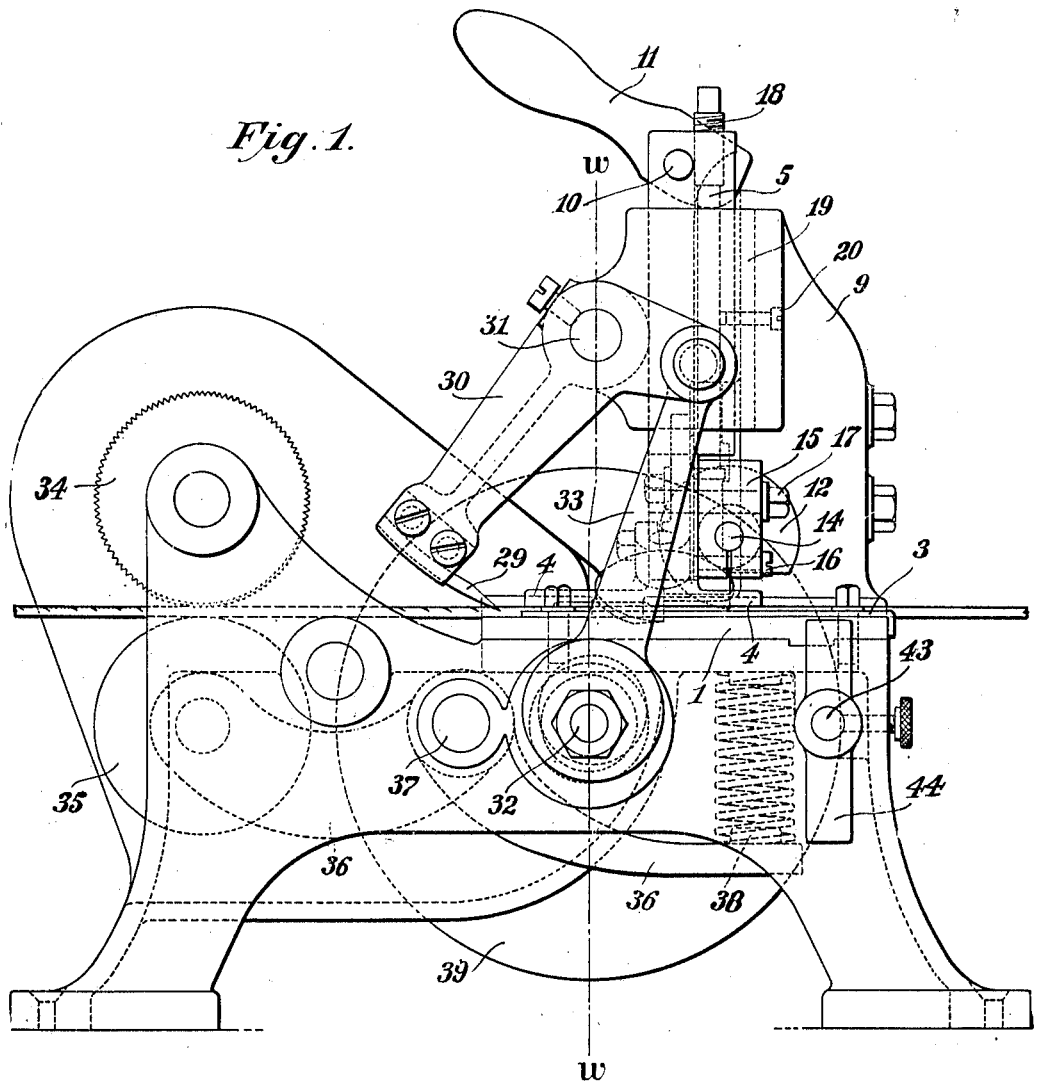
Figure 5:
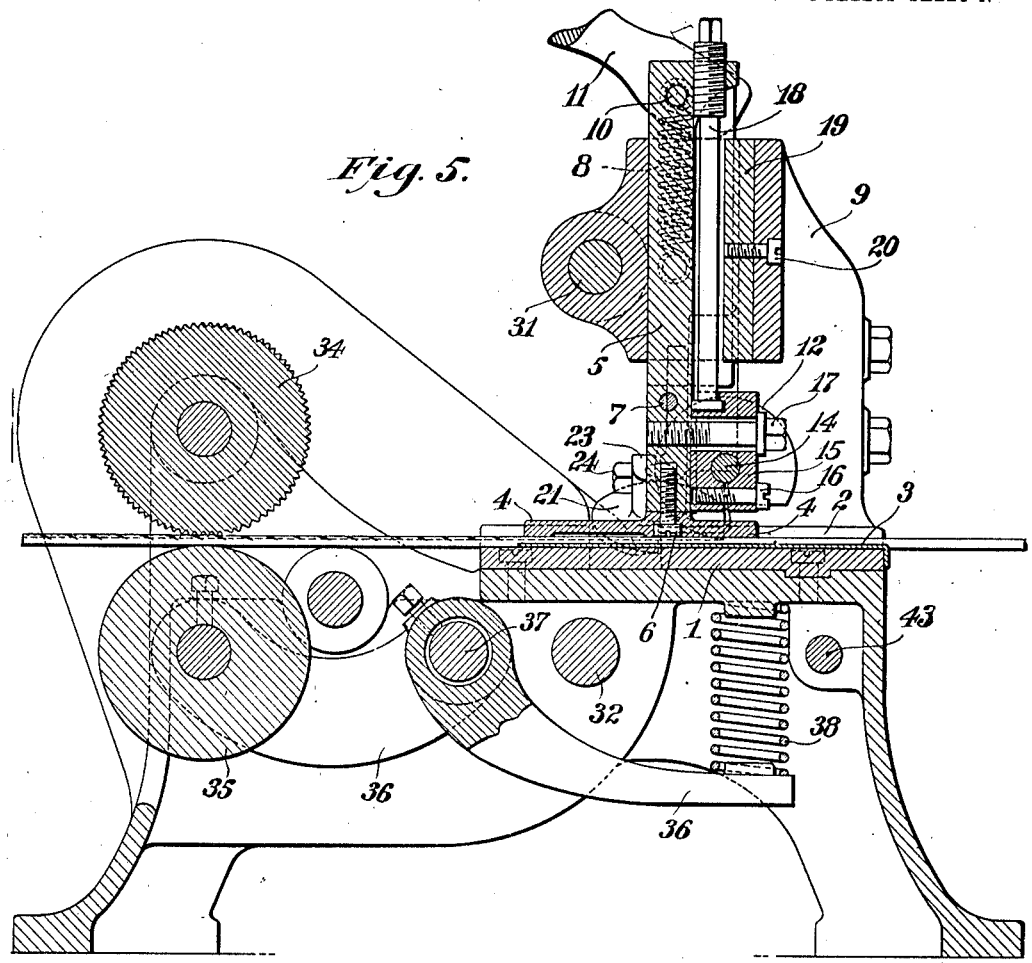
Figure 6:
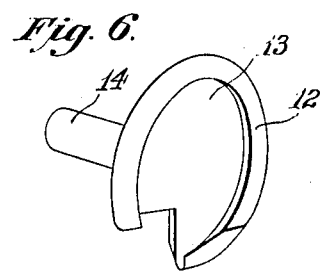

Figure 1 is a view in side elevation of the machine for grooving, beveling and slashing a welt. Fig. 2 is a transverse sectional view of the machine illustrated in Fig. 1 taken on the line $w$—$w$ of said figure. Fig. 3 is a longitudinal sectional view taken on the line $y$—$y$ of Fig. 2 but showing the welt beveling cutter in elevation. Fig. 4 is a plan view of the machine. Fig. 5 is a longitudinal sectional view taken on the line $x$—$x$ of Fig. 2. Fig. 6 is a detail perspective view of the welt grooving cutter detached from the machine.

In the machine illustrated in Figs. 1 to 5 the welt is guided and supported while being acted upon by the welt grooving, beveling and slashing knives, by means of a bed plate 1 secured to the base of the machine, a guiding flange 2 at the inner edge of the bed plate 1 arranged to engage the inner edge of the welt, an edge guide 3 adjustably secured to the base plate 1 so as to be capable of adjustment toward and from the flange 2, and arranged to engage the outer edge of the welt, and a presser foot 4 arranged to bear upon the surface of the welt which is uppermost in passing through the machine. The presser foot 4 is secured to a vertical slide 5 by means of a screw 6 passing through the presser foot into the lower end of the slide and by means of a screw 7 passing through an upwardly extending portion of the presser foot into the side of the slide. The slide 5 is acted upon by a coiled spring 8 connected at its lower end to a fixed standard 9 secured to the base plate of the machine and at its upper end to a pin 10 mounted in the upper end of the slide 5, the tendency of the spring being to depress the slide and hold the presser foot in contact with the welt. The slide 5 is mounted to reciprocate in the standard 9 and is provided with a lifting lever 11 pivotally mounted upon the stud 10 and having at one end a cam surface arranged to bear against the upper portion of the standard 9. By means of this lever the slide 5 and presser foot 4 can be raised by the operator to enable the welt strip to be inserted in the machine.

The welt passes through the machine with the surface which is uppermost in the completed shoe resting upon the base plate 1 and the grooving knife is accordingly arranged to act upon the surface of the welt which is uppermost in the machine. The grooving knife is indicated at 12, and in order that the groove formed by the knife may be of the same depth regardless of variations in the thickness of the welt, it is mounted upon the slide 5 so as to move up and down with the presser foot. The shape of the knife is best illustrated in Fig. 6 in which it will be seen that the knife blade is curved in the arc of a circle and is formed upon the periphery of a flat disk, the disk being provided with a notch, and the blade of the knife extending nearly around the disk. To permit the grooving knife to be secured to the slide 5, it is provided with a stud 14 projecting laterally from the center of the disk 13. This stud is received in a split clamp formed in a block 15 and is secured therein by means of a clamp screw 16. The block 15 is secured to the slide 5 by means of a screw 17 passing through a vertical slot in the block and screwing into the lower portion of the slide. This construction permits the block 15 to be adjusted vertically so that the grooving knife can be caused to make a groove in the welt of any desired depth. As a convenient means for adjusting the block 15, an adjusting rod 18 is provided, having a swivel connection at its lower end with the block 15 and at its upper end having a screw-threaded engagement with the slide 5. The upper end of the rod 18 extends above the slide 5 into a convenient position to be manipulated by the operator.

For convenience of manufacture the slide 5 is preferably cylindrical, and in order to hold the slide against rotation a rib 19 is secured to the standard 9 by means of a screw 20 and is arranged to engage a vertical slot formed in the slide.

In addition to a vertical adjustment, the grooving knife is capable of a rotary adjustment to bring the cutting edge of the knife into the required position as the blade of the knife becomes worn away in regrinding and is also capable of a lateral adjustment to vary the distance of the groove from the edge of the welt. Since the blade of the knife is arranged in the arc of a circle a rotary adjustment of the knife does not necessitate a change in either the vertical or the lateral adjustment. Also the arrangement of the blade of the grooving knife in the arc of a circle permits the use of a long knife blade which can be used for a considerable length of time before the blade becomes so worn away as to require the substitution of a new knife. Also the arrangement of the blade of the grooving knife in the arc of a circle permits the knife to be so placed in the machine that the portion of the knife blade directly back of the cutting edge extends in the direction in which the welt strip is fed, the cut surface of the strip being tangential to the groove of the knife blade. The knife blade thus cuts to the best possible advantage and the chip or strip removed by the knife passes easily over the upper surface of the blade.

The welt beveling knife is indicated at 21 and consists of a flat disk cut away as indicated in Fig. 3 to provide a cutting edge 22 extending from the periphery of the disk inwardly. The disk is mounted in the machine by means of a stud projecting laterally from the center of the disk and entering a split clamp 23 in which it is held by means of a clamp screw 24. This construction permits a rotary adjustment of the disk to bring the cutting edge 22 into the desired position as the edge becomes worn away in regrinding, and the shape of the knife permits the knife to be reground a great many times before it becomes worn out. The clamping block 23 forms a part of a block 25, which is mounted upon a block 26, so as to be capable of an angular adjustment to change the angle of the bevel produced by the knife 21 on the welt strip. The block 25 is provided with a curved rib which enters a curved slot in the block 26, and the rib and slot are substantially concentric with the point of operation of the knife on the welt, so that an angular adjustment of the block 25 produces no substantial displacement of the knife with relation to the welt. The block 25 is held in adjusted position by means of a clamping screw 27 passing through a slot in the block 25 and screwed into the block 26. To vary the depth of the cut produced by the knife 21, means are provided for adjusting the block 26 horizontally. This means, as shown, consists of an adjusting screw $27^a$ mounted on the standard 9, and having a screw-threaded engagement with the block 26. Clamping screws 28 passing through slots in the block 26 and screwing into the standard 9 serve to hold the block 26 in adjusted position.

The welt slashing knife is indicated at 29 and is clamped in the lower end of one arm of a bent lever 30 pivotally mounted at 31 upon the standard 9. The lever 30 is arranged to oscillate in a vertical plane above the welt, and at each oscillation the knife 29 cuts a transverse slit in the welt, extending across that portion between the groove and the outer edge of the welt, these slits being obliquely disposed with relation to the surface of the welt, as indicated in Fig. 1. During the cutting action of the knife 29 the welt is supported by the bed plate 1, and is firmly held thereon by the presser foot 4, which extends over the bed plate 1 into proximity to the path of movement of the knife 29. To oscillate the lever 30 an eccentric on the main driving shaft 32 is provided, which is connected by an eccentric strap and link 33 to the short arm of the bent lever 30.

In the machine illustrated in Figs. 1 to 5, a power operated feeding mechanism is provided, which acts to impart a continuous feeding movement to the welt strip. This feeding mechanism comprises a power driven feeding roll 34, and a spring pressed pressure roller 35, between which rolls the welt strip passes and by which the strip is pulled through the machine against the action of the grooving, beveling and slashing knives. The roll 34 is driven from the main driving shaft 32 through gearing which is clearly shown in Figs. 3 and 4, and this gearing is so proportioned that the slits which are formed in the welt by the knife 29 are spaced the desired distances apart. It will be noted that the path of movement of the knife 29 is such that the continuous feeding of the welt strip is not interfered with, the knife being so actuated that it moves substantially in the direction of feed while making its retracting stroke, and substantially in the opposite direction while making its cutting stroke. The knife thus coöperates with the feed in making the slits in the welt and moves out of engagement with the welt between successive cuts without interfering with the forward movement of the welt. The pressure roll 35 is mounted to rotate freely in one end of a lever 36 pivotally mounted at 37. The other end of the lever 36 is acted upon by a coiled spring 38 by means of which the roll 35 is pressed yieldingly toward the roll 34.

To enable the machine to be thrown into and out of operation the belt pulley 39 is mounted to rotate loosely and move longitudinally on the main driving shaft, and is provided with a clutch member 40 adapted to engage a clutch member 41 fixed on the driving shaft. An arm 42, secured to one end of a shipper rod 43, engages the hub of the pulley 39, and the shipper rod 43 is provided with a handle 44, by means of which the shipper rod can be actuated by the operator to move the driving pulley 39 and the clutch member 40 toward and from the clutch member 41.

It is to be understood that the constructions and arrangement of parts illustrated in the drawings and above described embody the various features of the present invention in their preferred form only and that except as defined in the claims the invention is not limited thereto.

I claim—

1. A machine for preparing welts, having, in combination, means for supporting and guiding a welt strip, means for continuously feeding the strip, and means for forming in the strip a series of transverse slits extending partially through the thickness of the strip and partially across the width of the strip.

2. A machine for preparing welts, having, in combination, means for supporting and guiding a welt strip, means for continuously feeding the strip, a welt slitting knife arranged to form transverse slits in the strip extending partially through the strip, and means for moving the knife in the direction of the feed while making its retracting stroke and in the opposite direction while making its cutting stroke.

3. A machine for preparing welts, having, in combination, means for supporting and guiding a welt strip, means for continuously feeding the strip, a vibrating slitting knife arranged to form transverse slits in the strip extending partially through the thickness of the strip and partially across the width of the strip, and means for actuating the knife.

4. A machine for preparing welts, having, in combination, means for supporting and guiding a welt strip, means for continuously feeding the strip, a welt slitting knife arranged to form transverse slits in the strip extending partially through the thickness of the strip, and means for oscillating the knife in a path obliquely disposed with relation to the surface of the strip and extending from the strip in the direction of the feed.

5. A machine for preparing welts, having, in combination, means for supporting and guiding a welt strip, welt grooving and beveling knives, a welt slitting knife arranged to form transverse slits in the welt extending partially through the thickness of the welt, and means for continuously feeding the welt strip to the knives.

6. A machine for preparing welts, having in combination, means for supporting and guiding the welt strip, means for continuously feeding the strip, welt grooving and beveling knives, a welt slitting knife arranged to form transverse slits in the strip extending partially through the strip and means for moving the knife in the direction of the feed while making its retracting stroke and in the opposite direction while making its cutting stroke.

In testimony whereof I affix my signature, in presence of two witnesses.

ANDREW EPPLER.

Witnesses:
FRED O. FISH,
ALFRED H. HILDRETH.